United States Patent
Lesage et al.

(10) Patent No.: US 9,068,767 B2
(45) Date of Patent: Jun. 30, 2015

(54) GAS-FIRED WATER HEATER WITH SEPARABLE HEAT EXCHANGER OR DETACHABLY CONNECTED EXTERNAL WATER HEATER

(76) Inventors: Claude Lesage, Pointe Claire (CA);
Jean-Claude Lesage, Kirkland (CA)

( * ) Notice: Subject to any disclaimer, the term of this patent is extended or adjusted under 35 U.S.C. 154(b) by 514 days.

(21) Appl. No.: 13/424,667

(22) Filed: Mar. 20, 2012

(65) Prior Publication Data
US 2012/0222631 A1    Sep. 6, 2012

Related U.S. Application Data

(63) Continuation-in-part of application No. 12/886,910, filed on Sep. 21, 2010, now abandoned.

(51) Int. Cl.
| | |
|---|---|
| *F24H 1/52* | (2006.01) |
| *F25B 25/00* | (2006.01) |
| *F24H 1/20* | (2006.01) |
| *F24H 4/04* | (2006.01) |
| *F24H 8/00* | (2006.01) |
| *F24H 9/02* | (2006.01) |

(52) U.S. Cl.
CPC ............. *F25B 25/005* (2013.01); *Y02B 30/102* (2013.01); *F24H 1/202* (2013.01); *F24H 1/205* (2013.01); *F24H 4/04* (2013.01); *F24H 8/00* (2013.01); *F24H 9/02* (2013.01)

(58) Field of Classification Search
CPC ....................................................... F24H 1/52
USPC ....... 122/7 R, 15.1, 18.1, 18.3, 20 B, 36, 123, 122/225 A; 237/19; 62/238.7, 324.3, 332, 62/392
See application file for complete search history.

(56) References Cited

U.S. PATENT DOCUMENTS

| | | | | | |
|---|---|---|---|---|---|
| 4,178,907 | A | * | 12/1979 | Sweat, Jr. ...................... | 261/39.1 |
| 4,371,111 | A | * | 2/1983 | Pernosky ...................... | 237/8 R |
| 4,401,261 | A | * | 8/1983 | Brown ........................... | 236/10 |
| 4,558,689 | A | * | 12/1985 | McCann ....................... | 126/117 |
| 4,681,257 | A | * | 7/1987 | Turner ........................... | 237/56 |
| 4,940,042 | A | * | 7/1990 | Moore et al. ................. | 122/18.2 |
| 4,955,930 | A | * | 9/1990 | Robinson, Jr. ................ | 62/79 |
| 5,052,187 | A | * | 10/1991 | Robinson, Jr. ................ | 62/79 |
| 7,628,337 | B2 | * | 12/2009 | Cuppetilli et al. ............. | 237/19 |
| 7,866,283 | B2 | * | 1/2011 | Clark et al. ................... | 122/15.1 |
| 8,740,611 | B2 | * | 6/2014 | Hallit ............................. | 431/23 |
| 8,770,153 | B2 | * | 7/2014 | Hamada et al. .............. | 122/15.1 |
| 2009/0211540 | A1 | * | 8/2009 | Yin et al. ...................... | 122/18.3 |
| 2009/0301406 | A1 | * | 12/2009 | Ritsema et al. ............ | 122/13.01 |

* cited by examiner

*Primary Examiner* — Gregory A Wilson
(74) *Attorney, Agent, or Firm* — Guy J. Houle; Houle Patent Agency Inc.

(57) ABSTRACT

A hot water heater, particularly but not exclusively for domestic use, is herein described and having removably secured thereto a modular heat exchanger or an external water heater to heat the water in a separate tank portion. The two are easily separable from one another for service, repair or interchange. The air-to-air heat exchanger extracts heat loss from the central flue of a gas fired water heater to provide a source of heat for the building in which the hot water heater is installed. The external water heater is provided with a gas-fired burner for heating water from the tank circulated in a heat exchanger to transfer heat from a fluid heated by the burner and circulated in the heat exchanger to transfer the heat to water circulated from the water tank.

15 Claims, 7 Drawing Sheets

GAS-FIRED WATER HEATER WITH SEPARABLE HEAT EXCHANGER OR DETACHABLY CONNECTED EXTERNAL WATER HEATER

CROSS-REFERENCE TO RELATED APPLICATION

This application is a continuation-in-part of application Ser. No. 12/886,910, filed Sep. 21, 2010 now abandoned.

TECHNICAL FIELD

The present invention relates to water heaters, particularly but not exclusively, to domestic hot water heaters to which is integrated a modular heat exchanger or a hot water containing tank having an external water heater and wherein the two are easily separable from one another for service, repair or interchange.

BACKGROUND ART

It is known to integrate heat pumps with domestic hot water heaters wherein the hot gases are used in heat exchange with water circulated from the hot water heater to provide an added heat source to heat water and this usually results in complex devices integrated together in a single unit. A disadvantage of such integrated devices is that because domestic hot water heaters utilize glass-lined casings whose life span is usually short, and when such becomes defective it is necessary to effect expensive modifications or to change the entire integrated device unit instead of only the hot water tank. Also, maintenance of integrated systems can be expensive depending on its structure. Accordingly, there is added fabrication costs and service cost when using integrated hot water systems and this cost can sometimes obviate the projected economical advantages of such systems. Such advantages include lower electrical energy consumption as it is less expensive to operate a compressor of a heat exchanger than the electrical resistive elements of water heaters. However, the refrigeration system provides cool air conditioning.

With gas-fired hot water heaters there is also considerable heat loss to the environment through the exhaust flue. There is also a need to considerably reduce such heat loss.

Because water tanks of domestic water heaters have a relatively short life, it would also be beneficial to heat the water exteriorly of the tank whereby tank replacement would be less costly. Also, the water heater could be serviced independently.

SUMMARY OF INVENTION

It is a feature of the present invention to provide a water heater device with an integrated modular heat exchanger which substantially overcomes the above-mentioned disadvantages of the prior art.

Another feature of the present invention is to provide a water heater device with an integrated modular heat exchanger and wherein the water heater and heat exchanger are interconnected by detachable coupling means to disconnect the modular heat exchanger from the water heater for replacement or servicing of the water heater or the modular heat exchanger.

Another feature of the present invention is to provide a two-portion water heater device, one portion being the insulated water tank and the other an integrated modular heat exchanger with a modulating gas power burner to heat the water and which is more efficient and less costly to operate than stand-alone hot water heaters having resistive heating elements.

Another feature of the present invention is to provide a domestic hot water heater having an air-to-air heat exchange modular apparatus mounted on the top wall of the heater by detachable support means for recovering heat from the exhaust flue to heat the air in the environment.

Another feature of the present invention is that because the water tank and modular heater are separable, replacement of the tank or heater can be effected more quickly and requiring less expenditure and inconvenience to the owner.

According to a broad aspect of the present invention there is provided a gas-fired water heater with an integrated modular air-to-air heat exchange apparatus. The water heater has an insulated tank for storing water to be heated. A combustion chamber is provided under a lower portion of the tank and has a gas burner therein. A flue passageway is provided in the tank and has an outlet end exiting a top wall of an enclosure of the tank. The air-to-air heat exchanger is connected to the outlet end and constructed to communicate hot flue gases exiting the outlet end with heat conductive elements in contact with ambient air whereby to extract heat from the hot flue gases and release the heat to the ambient air.

According to a still further broad aspect of the present invention, there is provided a water heater comprised of a water tank for the containment of heated water and an external modular water heater detachably connected to the tank to heat water therein. The tank has a water inlet. A hot water outlet is provided in a top portion of the tank. A water supply connecting means and a heated water return connecting means is provided in a top portion of the water tank. The water supply connecting means has a water supply conduit extending to a predetermined location in the water tank. The heated water return connecting means has a hot water return conduit. The modular water heater has a gas-fired burner for heating a fluid circulated in a heat exchanger for heat transfer communication with cooler water circulating between the water supply connecting means and the heated water return connecting means.

According to a still further broad aspect of the present invention there is provided a water heater comprised of a water tank for the containment of heated water and an external modular water heater detachably connected to the tank to heat water therein.

According to a still further broad aspect of the present invention there is provided a water heater comprised of a water tank for the containment of heated water and an external modular water heater detachably connected to the tank to heat water therein. The modular water heater has a gas-fired burner for heating a fluid circulated therein in a closed conduit loop. The closed conduit loop has a portion thereof connected in a heat exchanger for heating water circulated in an exterior conduit loop having a water intake and in communication with water in a bottom region of the tank and a water outlet end in an upper region of the tank.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
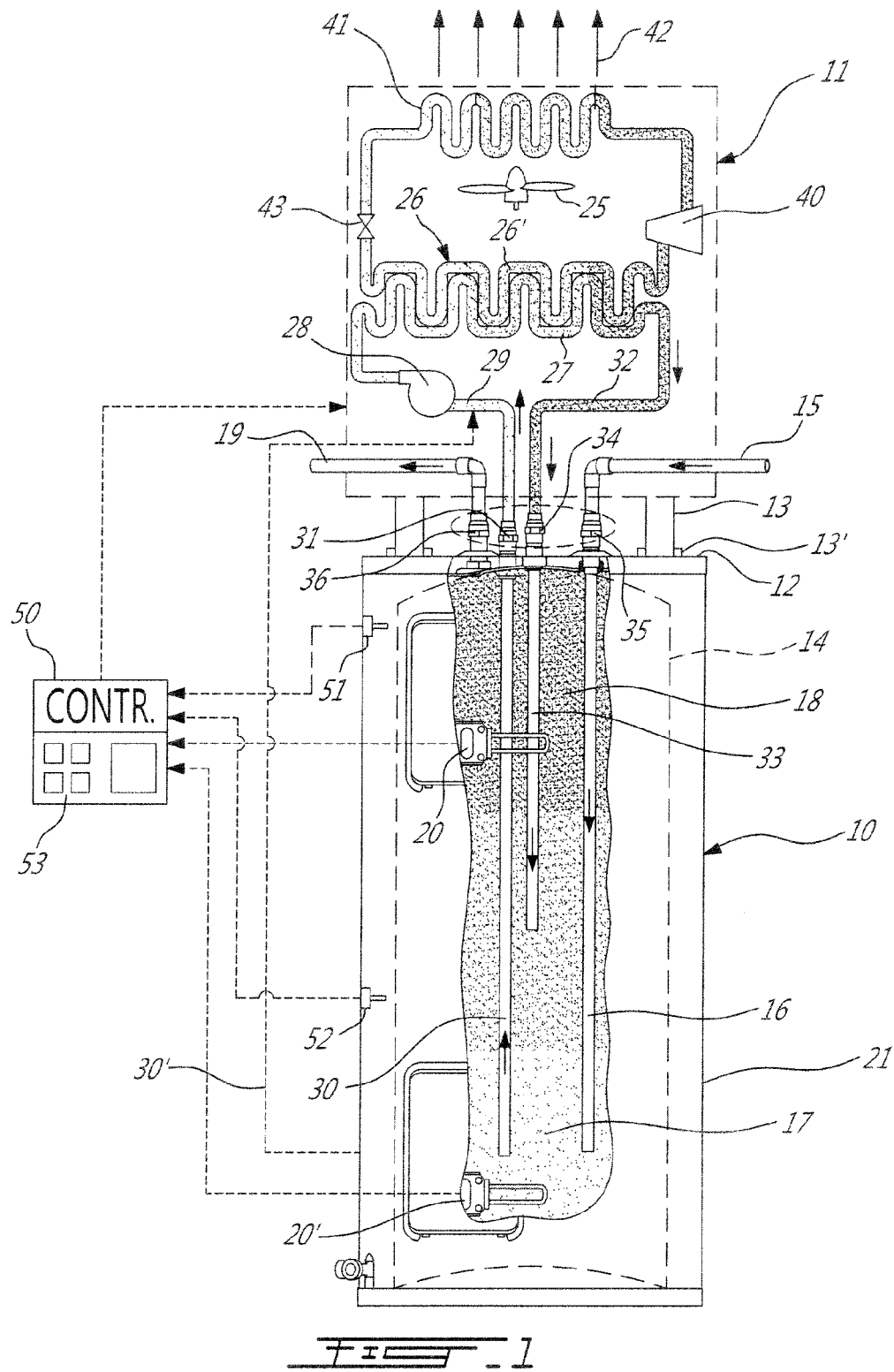
FIG. 1 is a schematic diagram showing an integrated water heater device and modular heat pump constructed in accordance with the present invention.

Referring now to the drawings, and more particularly to FIG. 1, there is generally shown at 10 a water heater device, herein a domestic hot water heater device. A modular heat exchange apparatus, herein a heat pump 11 is hereinshown detachably mounted on the top wall 12 of the hot water heater 10 by detachable supports 13. The supports 13 are provided with suitable detachable fastening means 13' in a lower part thereof.

The domestic hot water heater 10 has an insulated glass lined or stainless steel lined inner casing 14. Water is introduced in the casing by a domestic cold water inlet conduit 15 and released through a dip tube 16 connected thereto in a lower portion 17 of the inner casing 14. Hot water is extracted from the upper portion 18 of the inner casing, where the water is the hottest, by a hot water outlet conduit 19. Resistive heating elements 20 and 20' are used to heat water in the upper and lower portion of the inner casing. The inner casing is also insulated by an insulating foam material (not shown) introduced in the space surrounding the inner casing and the outer shell 21. All of this structure is well known in the art.

As hereinshown, the modular heat pump 11 is provided with a refrigeration system including a condensation coil 26 which has a refrigeration conduit 26' in which is circulated a compressible gas, such as Freon. The refrigeration conduit 26' is in contact with a water circulation conduit 27 in which cold water from the inner casing 14 is fed by a pump 28 which is secured to a supply conduit 29 connected to a dip tube 30 whereby to extract cooler water from the lower portion 17 of the inner casing of the hot water heater 10. This supply conduit 29 is secured to the dip tube 30 by a detachable coupling means, such as a quick-connect coupling 31. As the cold water circulates through the water circulation conduit 27, it is in heat exchange relationship with the hot gas of the hot refrigerant in the conduit 26' and is heated thereby while cooling the gas. The refrigeration conduit 26' and the circulation conduit 27 may be concentrically mounted, as for example, for heat exchange.

The heated water from the water circulation conduit 27 exits the condensation coil 26 through a hot water supply conduit 32 and is fed to a further dip tube 33 which terminates inside the inner casing 14 at approximately two-thirds (⅔) distance down from the upper end of the inner casing 14 in a region where water is at an intermediate temperature whereby to introduce hot water from the heat pump. The hotter water propagates towards the top of the casing. The conduit 32 is secured to the dip tube 33 through another detachable coupling 34. Also, the cold water conduit 15 is secured to the dip tube 16 through a further similar detachable coupling 35 and the hot water outlet conduit 19 is also connected to the top portion of the inner casing by a similar detachable coupling 36 over the top wall 12 of the outer shell 21. It is pointed out that the detachable couplings 31, 34, 35 and 36 are connectors capable of being disconnected and reconnected by a trade person whereby to easily disconnect the modular heat pump from the water heater for the replacement or servicing of the water heater or the modular heat pump, if there is a need to disconnect them. The connectors 31, 34, 35 and 36 may be screw-type or quick connect type connectors or connectors that are soldered to the conduits 15, 19, 29 and 32, if such conduits are made of copper. Any suitable connection means is contemplated for detachment.

Because of the separable connections of both the hot water heater and the heat pump, if the inner casing 14 becomes defective, a new hot water heater 10 with its inner tank is replaced by the disconnection and re-connection of the quick connectors and the heat exchanger is secured on a new hot water heater. This can be done in a short time not to inconvenience the home resident. The previous hot water heater can then be recycled as only the inner casing needs to be changed and the heat pump can still be used.

As hereinshown, only basic elements of the integrated modular heat pump 11 are illustrated. The refrigeration system includes a compressor 40 and an evaporator coil 41 through which ambient air is pushed through by or drawn by a fan 25 whereby cooled dehumidified air 42 is expelled in the space where the heat pump is located or in conduits to convey it to other spaces in a building. The refrigeration system also uses an expansion valve 43 feeding the condensation coil 36. Such refrigeration systems are well known in the art and only the basic components are shown in a general fashion.

It is also foreseen that the supply conduit 30 may be located exteriorly of the hot water heater such as illustrated by phantom lines 30' and easily disconnected from the hot water heater 10 by a suitable fitting (not shown) but obvious to a person skilled in the art.

A controller module 50 is also provided to monitor water temperature from temperature sensors 51 and 52 located at predetermined locations inside the tank or inner casing 14 to monitor water temperature therein. Such is required to control the operation of the modular heat pump and the resistive heating elements 20 and 20' of the inner casing 14 to satisfy user settings. A control pad 53 interfaces with the controller and permits a user or service person to set the desired temperature of the water and the mode of operation of the system.

Although the integrated heat exchange apparatus is herein described as a modular heat pump, it is to be understood that other heat exchange apparatus may be coupled to the hot water device, such as a water-to-water heat exchange apparatus having a coil with warm circulation water therein and disposed like the condensation coil 26 in FIG. 1 for conduit 27. Such water-to-water heat exchange apparatus may be from chiller application, i.e., large air-conditioning systems with cooling towers as found in high-rise buildings.

Referring now to FIGS. 2A to 3B, there will be described two examples of a gas-fired water heater 55 and 55' both of which have an integrated modular air-to-air heat exchange apparatus 56 and 56'. As hereinshown, the water heater is comprised of an insulated water containment tank 57 and 57' for the storage of water to be heated. An outer skin or casing 58 and 58' surrounds the tank 57 and 57' and spaced therefrom wherein an insulating foam material (not shown) is disposed surrounding the water tank 57 and 57'. The tank as hereinshown has a bottom wall 59 and 59' under which there is located a combustion chamber 60 and 60'. A burner assembly 61 and 61' is located in the combustion chamber as is well known in the art. A flue passageway 61 and 61' extends centrally in the tank and is in communication with water contained within the tank to heat the water therein. The passageway has an outlet end 62 and 62' which exits a top wall 63 of the tank and protrudes to the top wall of the outer skin or casing 58.

Figure 2A:
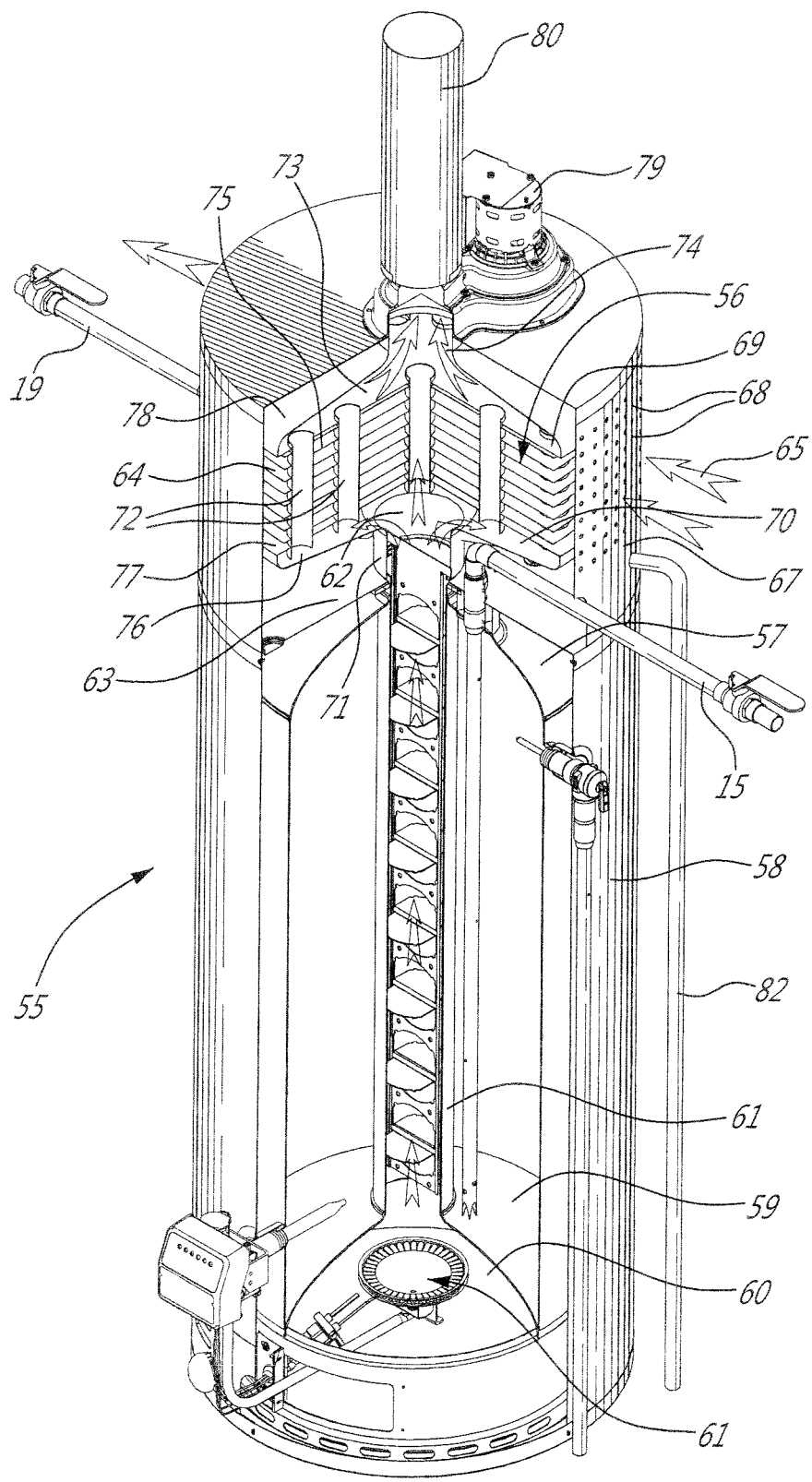
FIG. 2A is a perspective view, partly fragmented, of a gas-fired water heater having an integrated modular air-to-air heat exchanger secured over a top wall of the water heater.
Figure 2B:
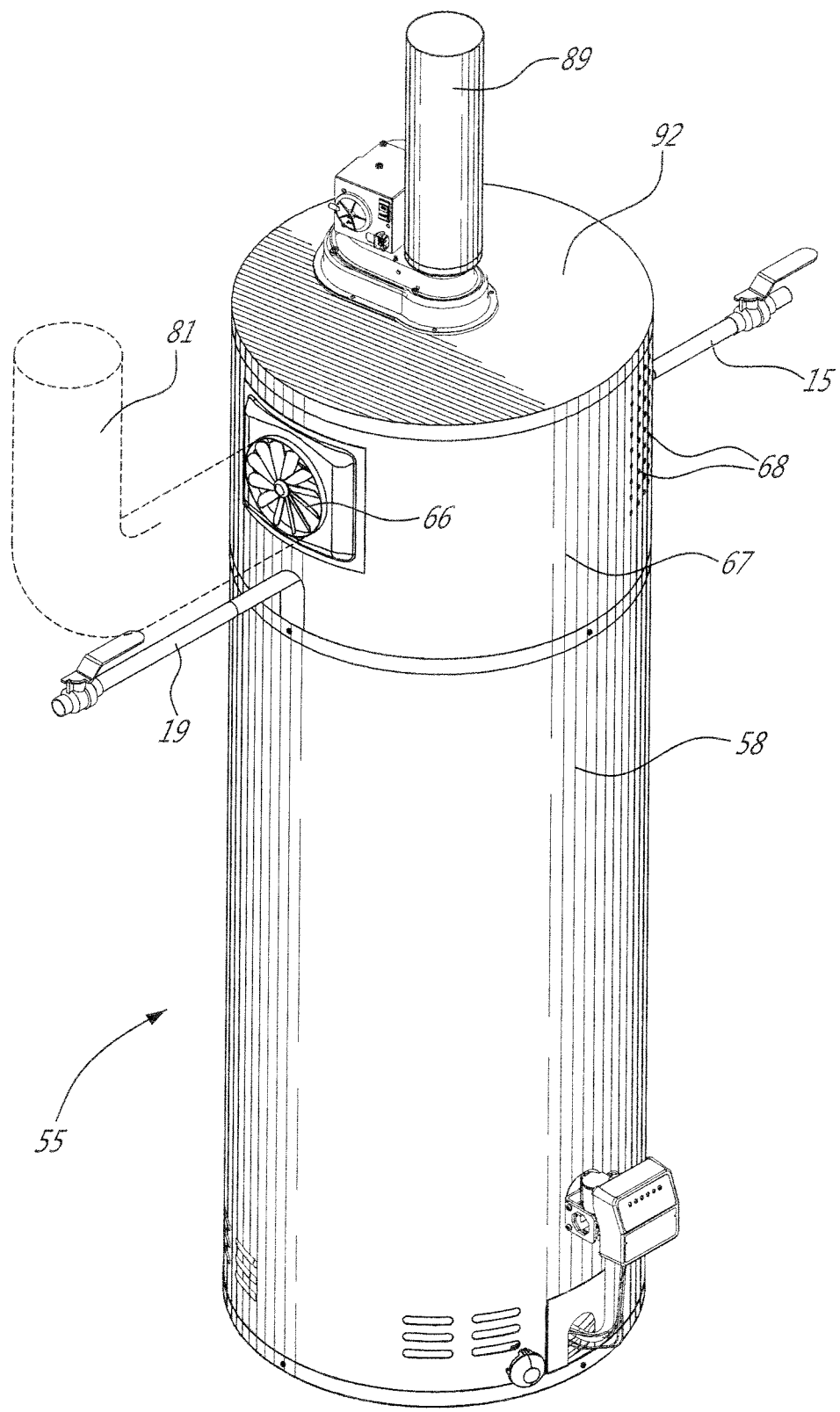
FIG. 2B is a further perspective view showing the water heater with a fan connected to the casing of the heat exchanger to circulate the air through the heat exchanger and exhausted into the ambient air.
Figure 3A:
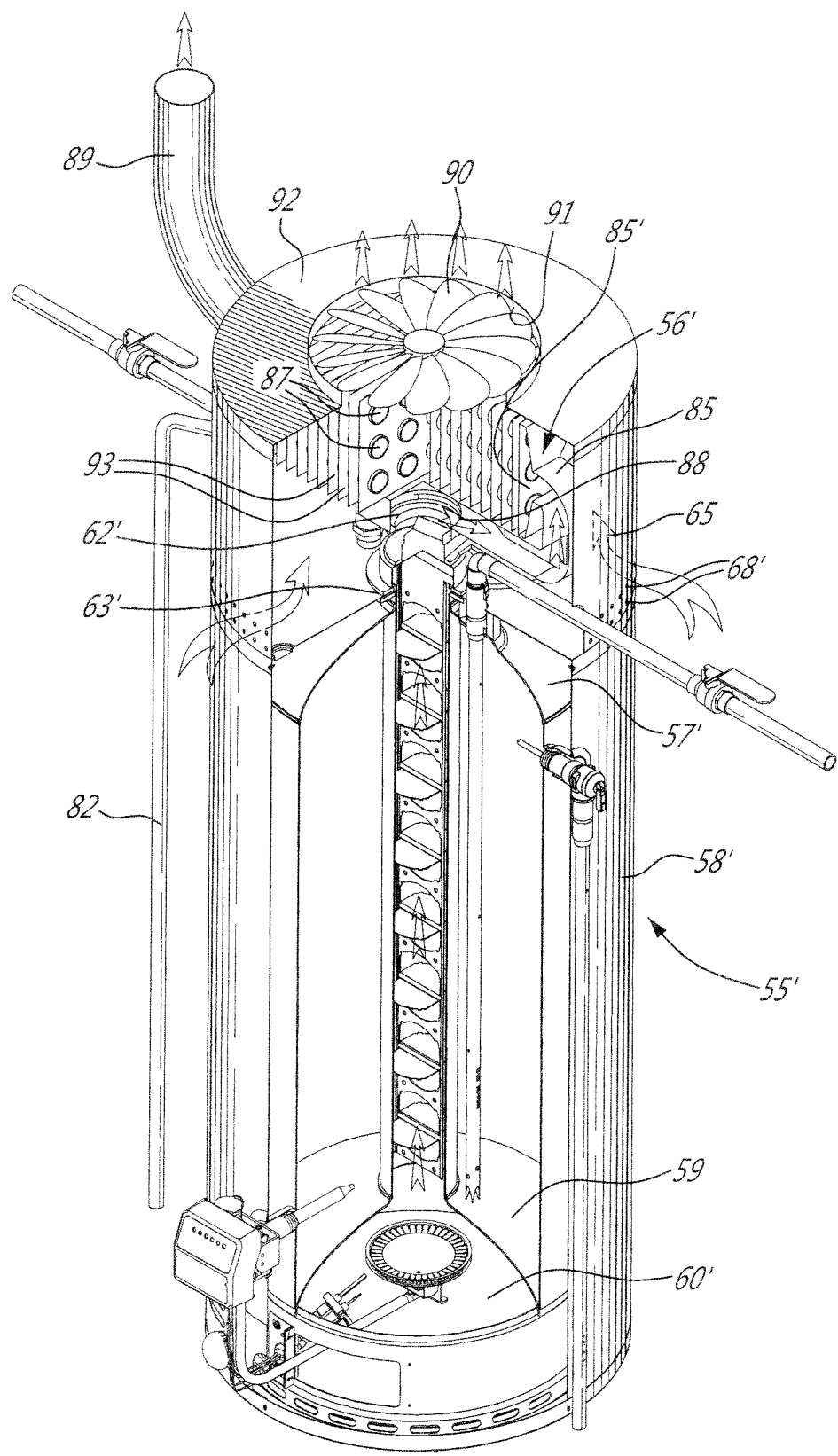
FIG. 3A is a further fragmented perspective view similar to FIG. 1, but showing a differently constructed air-to-air heat exchanger secured over the top wall of a conventional domestic water heater and wherein a fan is disposed in a top wall of the casing thereof to release heated air into the ambient air in the vicinity of the water heater.
Figure 3B:
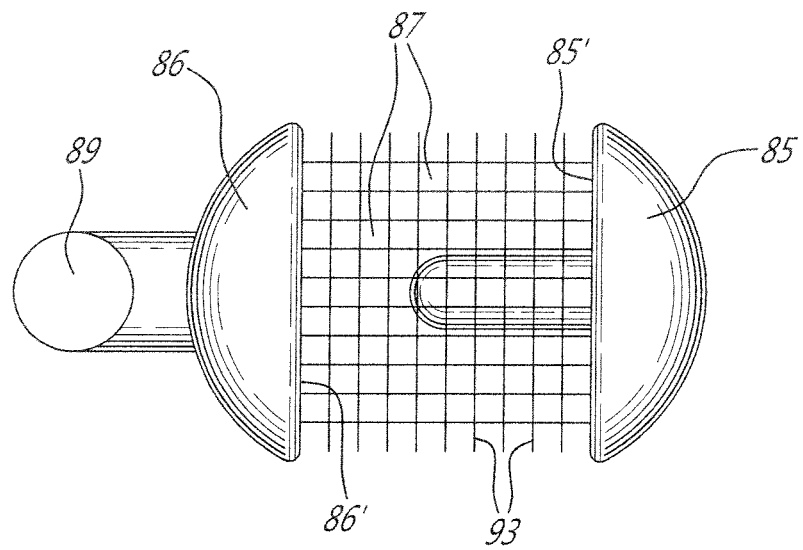
FIG. 3B is a top view showing the construction of the air-to-air heat exchanger.

As shown in FIGS. 2A and 2B, the air-to-air heat exchanger 56 is connected to the outlet end 62 of the flue passageway 61 and is constructed to communicate hot flue gases exiting the outlet end 62 with heat conductive elements 64 in contact with the ambient air, herein indicated by arrows 65 whereby to extract heat from the hot flue gases and release the heat in the ambient air by the use of a fan 66 as shown in FIG. 2B. The air-to-air heat exchanger of FIGS. 3A and 3B is of similar construction and reference to like parts will be described simultaneously hereinbelow. As hereinshown, the air-to-air heat exchangers 56 and 56' are concealed in an outer casing housing 67 and 67'. Openings 68 are provided on one side of the outer casing housing 67 and 67' opposite to the fan 66 whereby the fan displaces the ambient air 65 across the heat exchanger. The outer casing housing 67, 67' is of cylindrical shape and substantially of identical size as the enclosure or outer skin 58 of the hot water tank.

The air-to-air heat exchanger 56, as shown in FIG. 2A, has a flue gas diverting assembly 69 which has an inlet chamber 70 with a flue connecting inlet 71. A plurality of conduits 72 are sealingly secured between the inlet chamber 70 and an outlet chamber 73 secured spaced thereabove. A flue connecting outlet 74 is secured to the outlet chamber 73. A plurality of horizontally extending heat sink elements 75 are secured spaced-apart to the plurality of conduits 72 to extract heat therefrom. These heat sink elements 75 are heat conducting plates or fins usually constructed of aluminum which is a good heat conductor.

As hereinshown, the inlet chamber is a bottom horizontal chamber with the flue connecting inlet 71 being located centrally in a bottom wall 76 thereof. The conduits 72 are connected in a top wall 77 of the bottom chamber and extend vertically thereabove. The outlet chamber 73 is spaced above the bottom chamber and the flue connecting outlet 74 is formed centrally with the top wall 78 of the outlet chamber. As hereinshown, the flue connecting inlet 71 is also formed with the bottom wall 76 of the bottom chamber and extends centrally thereof for close fit sealing retention about the outlet end of the flue passageway and supports the air-to-air heat exchanger thereabove and spaced from the top wall of the outer casing 58 of the tank enclosure.

As shown in FIG. 2A, a blower 79 is secured to the flue conduit outlet 74 to draw hot combustion gases from the combustion chamber through the flue passageway and direct them through the heat exchanger and then exhaust them through conduits 80 to the outdoors.

As shown in phantom line in FIG. 2B, a conduit 81 can also be secured about the fan 66 to direct the warm air extracted from the flue gas into a remote location. Often the hot water tanks are installed in garages and the conduit 81 can direct their recovered heat in a living space of a building. The conduit 81 can also be connected to the ducting of a furnace where the fan of the furnace can direct the warm air released from the flue gases into the building structure. As also shown in FIG. 2A, a condensate collecting conduit 82 is connected to a pan (not shown) but obvious to a person skilled in the art to collect condensate from the flue gases as they are cooled by the air-to-air heat exchanger and directed the condensate to a drain (not shown).

Referring now to FIGS. 3A and 3B, the air-to-air heat exchanger apparatus 65' is constructed slightly differently and has vertically disposed spaced-apart inlet and outlet chambers 85 and 86 as better illustrated in FIG. 3B and interconnected by the horizontally disposed plurality of conduits 87 secured between the inlet and outlet chambers and extend between opposed vertical side walls 85' and 86' thereof. The flue connecting inlet 88 is secured to the inlet chamber 85. The flue connecting outlet 89 is connected to the outlet chamber 86. Accordingly, the hot flue gases exit the flue passageway 61 and into the inlet chamber 85 and then pass through the conduits 87 into the outlet chamber 86 and out through the flue connecting outlet conduit 89 to exhaust outside of the building structure.

As shown in FIG. 3A, a fan 90 is secured in an opening 91 formed in a top wall 92 of the outer casing housing 67' for pulling ambient air 65' through the openings 68' formed in the base of the outer casing housing under the stack of heat exchange fins 93 secured in a spaced-apart arrangement around the conduits 87 to extract heat therefrom and release them into the environment by the fan 90. Heat is also extracted from the chambers 85 and 86 and all component parts in the air flow.

Figure 4A:
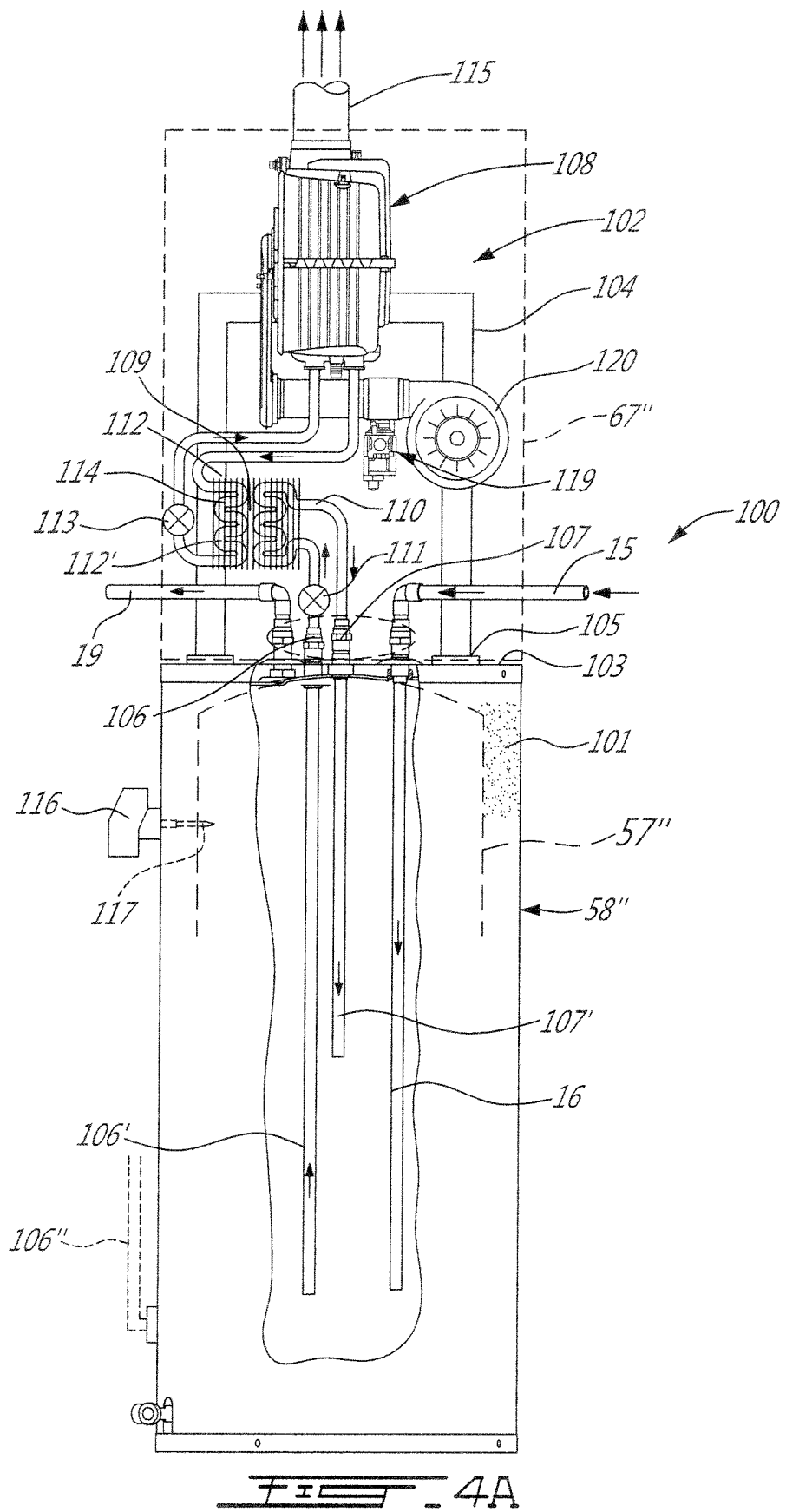
FIG. 4A is a longitudinal fragmented side view showing the construction of a water heater comprised of a water tank for the containment of heated water and external modular heater detachably connected to the tank and supported over a top wall thereof and concealed within a casing extending co-linear with the housing of the domestic water heater.

Referring now to FIG. 4A, there is shown the construction of a further modular water heater 100 which is comprised of a water tank 57" secured in an outer casing 58". Insulation material 101 disposed between the tank and the outer casing 58".

Cold domestic water under pressure is fed to the bottom of the tank by inlet conduit 15 which connects to the diptube 16 and releases cold water in the bottom portion of the water tank 57". Hot water is extracted from the top portion of the water tank by outlet conduit 19 as previously described.

As shown in FIG. 4A, an external modular water heater assembly 102 is detachably connected to the top portion of the water tank and outer casing top wall 103 by a suitable support frame 104 which is connected to the top wall 103 at a bottom end thereof by support legs 105 for disconnect from the top wall 103 of the tank. Other attachments are also contemplated as is obvious to a person skilled in the art. An outer casing housing 67" surrounds the modular water heater assembly to conceal the components of the assembly therein. There are two pipe couplings, namely a water supply coupling 106 and a heated water return coupling 107 connected to the top wall of the tank and exiting the top wall 103 of the outer casing for connection to the modular water heater. The water supply connecting coupling 106 is secured to a water supply conduit 106' which extends to a predetermined location in the water tank, herein to a lower region of the water tank to extract cooler water therefrom. The heated water connecting coupling 107 is connected to a hot water return conduit 107' which extends in a substantially central region of the water tank 57" to return hot water therein.

Figure 4B:
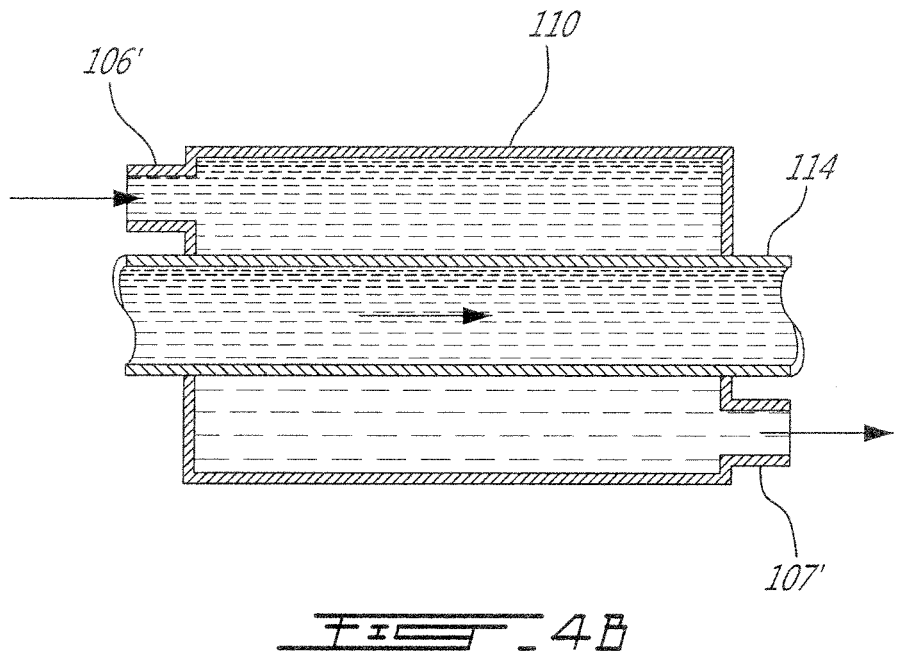
FIG. 4B is a cross-section showing a heat exchanger comprised of a concentric tube arrangement wherein hot gas or liquid within a conductive loop is in heat exchange with water circulated thereabout in an external conduit loop.
Figure 4C:
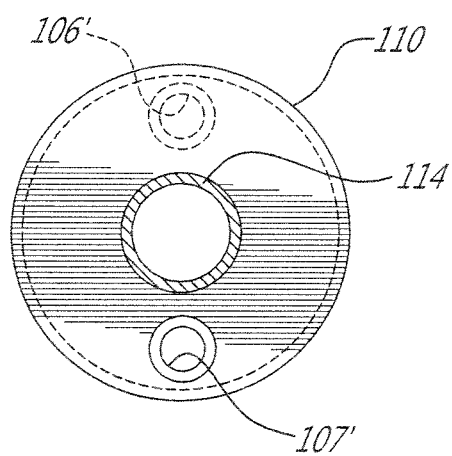
FIG. 4C is a transverse cross-section of FIG. 4B.

The modular water heater assembly 102 has a gas-fired burner 108 of a type well known in the art for heating a fluid circulated in a heat exchanger 109 for heat transfer communication with the cooler water circulating in a coil conduit loop 110 connected across the connectors 106 and 107. A pump 111 circulates the cold water from the bottom region of the water tank through the coil conduction loop 110. The fluid heated in the gas-fired burner 108 circulates through a further conduit loop 119 wherein heat from the hot fluid gas is extracted from the loop by a heat sink 112 and transferred to the coil conduit loop 110 to heat the cooler water therein. A pump 113 circulates the fluid within the conduit loop 114 and through the gas-fired burner 108. Heat from the gas-fired burner 108 is evacuated to the outdoors by an exhaust flue 115. The heat sink as hereinshown is formed by a stack of metal conducting fins 112' but the coupling means may be done by other heat transfer means such as shown in FIGS. 4B and 4C where a concentric arrangement of part of the conduit loops 110 and 114 wherein the conduit loop 114 has a larger diameter than the conduit loop 110 as shown in FIG. 4B whereby heat from the conduit 115 is surrounded by the cooler water pumped from the water supply conduit 106' whereby a large volume of water surrounds the conduit 115 containing the hot fluid therein to extract heat.

The external modular water heater 102 is a low pressure modulating gas power burner. A controller device 116 is connected to a temperature probe 117 to monitor the temperature of the water in the tank and operates the gas power burner to maintain a desired hot water temperature setting. The high efficiency design of the heat exchanger (90%+) allows combustion gases to condensate and this condensate is evacuated from the heat exchanger through a drain line not shown in FIG. 4A, but obvious to a person skilled in the art. The input modulation is accomplished using a variable speed premix combustion blower 120, a venturi (not shown) and a gas valve 119. The heat transfer fluid from the gas-fired burner could be a mixture of glycol and water or any other type of heat transfer fluid. It is also pointed out that the water supply conduit 106' may be an exterior conduit such as shown in phantom lines at 106" which is secured to the bottom region of the tank.

Broadly stated, the water heater combo as shown and described in FIG. 4A comprise essentially a water tank 57" for the containment of heated water and an external modular water heater 108 detachably connected to the tank to heat water therein. As herein described, the modular water heater has a gas-fired burner for heating a heat transfer fluid circulated therein in a closed conduit loop 114. The closed conduit loop has a portion thereof connected in a heat exchanger arrangement with a conduit loop circulating cold water from the bottom region of the tank and returning it to a mid-region of the tank after extracting heat from the conduit loop 114. Therefore, if there is a need to change the tank after its useful life, it is simply disconnected from the gas-fired burner assembly and a new tank reconnected by disconnecting four pipe couplings and support feet of a support frame for the burner assembly. Suitably, the gas-fired burner can be disconnected for service or replacement.

It is within the ambit of the present invention to cover any obvious modifications of the water heater device integrated modular designs as illustrated and described herein. For example, although the modular heat exchanger or heater assembly is hereinshown resting on the top wall of the hot water heater by disconnectable supports 13, it is also foreseen for certain of the embodiments disclosed herein that the modular heat exchanger or heater assembly can be suspended from a ceiling or attached to an adjoining wall adjacent the water tank or water heater 10. Also, all of the conduits may be flexible conduits as now commonly utilized in plumbing and provided with appropriate quick disconnect connectors to connect to the hot water heater 10. Although the hot water heater 10 of FIG. 1 is shown with two resistive elements, a third or more resistive elements could be incorporated inside the inner casing depending on the performance required for the supply of hot water. The hot water device may be constructed for commercial applications and wherein the hot water reservoir may be of a larger capacity than domestic water heaters.

We claim:

1. A gas-fired water heater with an integrated modular air-to-air heat exchange apparatus, said water heater having an insulated tank for storing water to be heated, a combustion chamber under a lower portion with said tank and having a gas burner therein, a flue passageway in said tank and having an outlet end exiting a top wall of said tank, said air-to-air heat exchanger connected to said outlet end and constructed to communicate hot flue gases exiting said outlet end with heat conductive elements in contact with ambient air whereby to extract heat from said hot flue gases and release said heat to said ambient air, said air-to-air heat exchanger being comprised of a flue gas diverting assembly having an inlet chamber with a flue connecting inlet, a plurality of conduits sealingly secured between said inlet chamber and an outlet chamber, a flue connecting outlet secured to said outlet chamber, a plurality of heat sink elements secured to said plurality of conduits to extract heat therefrom, said inlet chamber being a bottom chamber, said flue connecting inlet being located in a bottom wall thereof, said conduits being connected in a top wall of said bottom chamber and extending vertically thereabove, said outlet chamber being spaced above said bottom chamber, said flue connecting outlet being in a top wall of said outlet chamber.

2. A gas-fired water heater as claimed in claim 1 wherein said heat sink elements are constituted by heat conductive fins.

3. A gas-fired water heater as claimed in claim 2 wherein said heat conductive fins form a stack of spaced-apart horizontal fins interposed about said plurality of conduits between said inlet chamber and said outlet chamber.

4. A gas-fired water heater as claimed in claim 1 wherein said flue connecting inlet is a cylindrical sleeve secured to a bottom wall of said bottom sealed chamber, said cylindrical sleeve being connected to said outlet end of said flue passageway.

5. A gas-fired water heater as claimed in claim 4 wherein air-to-air heat exchanger is concealed in an outer casing housing, said outer casing housing having openings for the passage of said ambient air, and a fan secured in an opening formed in a top wall of said housing for pulling air through said openings and into said casing and through said heat sink elements to be heated and discharged in the environment of said water heater from said top wall.

6. A gas-fired water heater as claimed in claim 1 wherein a blower is secured to said outlet end of said flue passageway to draw hot combustion gases from said flue passageway and direct them in said flue connecting inlet of said housing.

7. A gas-fired water heater as claimed in claim 1 wherein a blower is in communication with said outlet end formed in a top wall of said top sealed chamber to draw combustion gases through said air-to-air heat exchanger.

8. A gas-fired water heater as claimed in claim 1 wherein said air-to-air heat exchanger is a modular unit detachably secured above said top wall of said enclosure.

9. A gas-fired water heater as claimed in claim 8 wherein air-to-air heat exchanger is concealed in an outer casing housing, said outer casing housing having openings for the passage of said ambient air therethrough.

10. A gas-fired water heater as claimed in claim 9 wherein there is further provided a fan secured in an opening of said outer casing housing; said openings in said outer casing housing being located on an opposite side of said housing.

11. A gas-fired water heater as claimed in claim 10 wherein said outer casing housing is of cylindrical shape and substantially of identical diameter as said enclosure of said tank, and a blower secured to a top wall of said outer casing housing in communication with a flue outlet of said air-to-air heat exchanger.

12. A gas-fired water heater as claimed in claim 10 wherein a conduit is secured about said fan to channel heated air from said air-to-air heat exchanger to a remote location.

13. A gas-fired water heater as claimed in claim 8 wherein there is further provided a fan secured adjacent said heat conductive elements to displace said ambient air thereacross.

14. A gas-fired water heater as claimed in claim 1 wherein there is further provided condensate collecting means to collect condensate from said flue gases as they are cooled by said air-to-air heat exchanger.

15. A gas-fired water heater as claimed in claim 1 wherein said inlet and outlet chambers are side chambers disposed spaced-apart by said conduits extending between opposed facing vertical side walls of said side chambers, said flue connecting inlet being secured to said inlet chamber and said flue connecting outlet being secured to said outlet chamber.

* * * * *